Patented Aug. 7, 1951

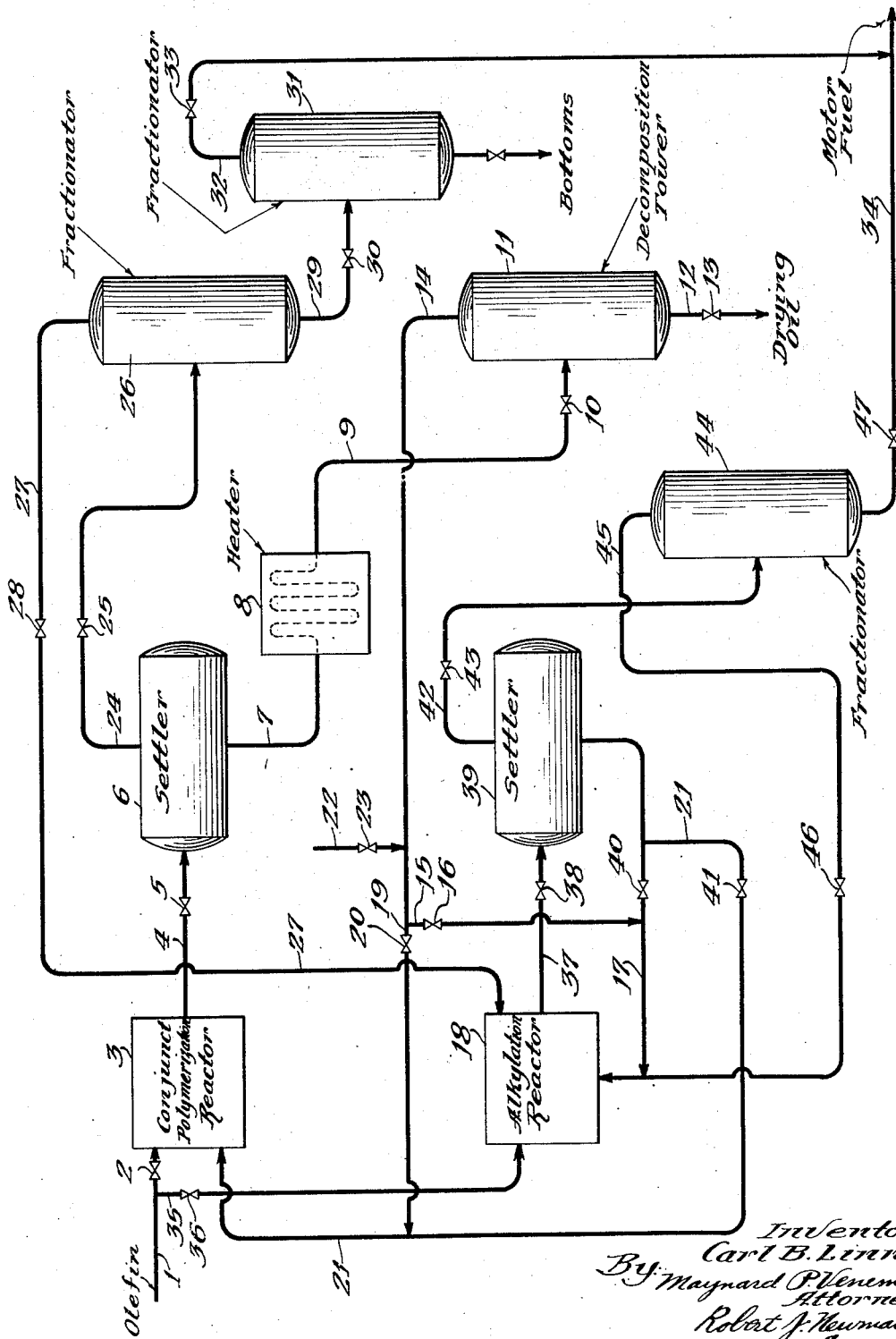

2,563,051

UNITED STATES PATENT OFFICE 2,563,051

PRODUCTION OF MOTOR FUEL AND DRYING OIL BY HYDROGEN FLUORIDE POLYMERIZATION AND ALKYLATION

Carl B. Linn, Riverside, Ill., assignor to Universal Oil Products Company, Chicago, Ill., a corporation of Delaware Application November 28, 1947, Serial No. 788,638

8 Claims. (Cl. 260—683.4)

1

This invention relates to the conversion of olefins containing from 3 to about 8 carbon atoms per molecule to other types of valuable hydrocarbon products. More specifically, it relates to a combination process for the conversion of olefins containing from 3 to about 8 carbon atoms per molecule to gasoline and polyunsaturated hydrocarbons. Still more specifically, it is concerned with a method, comprising a combination of interrelated steps, whereby isobutylene is converted to substantially olefin-free motor fuel and a drying oil.

In one embodiment my invention relates to a process which comprises subjecting an olefin containing from 3 to 8 carbon atoms per molecule to the action of hydrogen fluoride at relatively severe conjunct polymerization conditions thereby to form a hydrogen fluoride-hydrocarbon complex, isobutane, and higher boiling upper layer hydrocarbons, separating said isobutane and alkylating the same with an olefin containing from 3 to 8 carbon atoms per molecule in the presence of hydrogen fluoride at alkylating conditions.

In a more specific embodiment my invention relates to a process which comprises subjecting isobutylene to the action of hydrogen fluoride at relatively severe conjunct polymerization conditions thereby to form a hydrogen fluoride-hydrocarbon complex, isobutane and higher boiling upper layer hydrocarbons, separating said isobutane, alkylating the same with isobutylene in the presence of hydrogen fluoride at alkylating conditions, withdrawing hydrogen fluoride from the alkylation step and supplying at least a portion thereof to the conjunct polymerization step, withdrawing the hydrogen fluoride-hydrocarbon complex from the last-named step and supplying it to a decomposition step wherein the complex is decomposed to hydrogen fluoride and a polyunsaturated oil, recovering the hydrogen fluoride, and supplying at least a portion thereof to the alkylation step.

In another specific embodiment, my invention relates to a process which comprises subjecting isobutylene to the action of hydrogen fluoride at conjunct polymerization conditions thereby to form a hydrogen fluoride-hydrocarbon complex, isobutane, and higher boiling upper layer hydrocarbons, separating said isobutane and said higher boiling upper layer hydrocarbons, alkylating the isobutane with isobutylene in the presence of hydrogen fluoride at alkylating conditions, separating the alkylate thus produced, fractionating said higher boiling upper layer hydrocarbons to produce a fraction boiling within the gasoline range, and blending said last-named fraction with said alkylate.

2

One step of my invention comprises contacting a suitable olefin with hydrogen fluoride at conjunct polymerization conditions such that appreciable amounts of isobutane are formed. By conjunct polymerization, I mean the series of simultaneously catalyzed reactions whereby monoolefins are converted, by means of polymerization, cyclization, and hydrogen transfer reactions, in part to saturate hydrocarbons, part of which are of higher molecular weight than the original olefin; the remainder of the monoolefins being converted to cyclic polyenes more unsaturated than the original olefin. The saturated products form a separate hydrocarbon phase, often referred to as upper layer. The cyclic polyenes, which contain considerable conjugated unsaturation and which possess drying oil properties, are associated with the catalyst in the form of a complex. The polyenes or the drying oil is recovered by the decomposition of the catalyst-hydrocarbon complex under conditions controlled to minimize degradation of the oil and to provide substantially complete catalyst recovery.

The upper layer is a wide boiling range substantially olefin-free mixture of hydrocarbons; a considerable portion of which comprises hydrogenated unpolymerized charge stock. A typical upper layer produced from a C8 polymer contains 50% of material boiling within the gasoline range, said material having an F-2 octane number of about 82. When isobutylene is used as a charge stock to the conjunct polymerization step, appreciable amounts of isobutane are found in the upper layer, even at mild conditions of operation. More isobutane is produced at higher reaction temperatures. When other olefins are used, isobutane is found in the upper layer product in appreciable quantities when relatively severe conditions of operation are employed. The more sever conjunct polymerization conditions also tend to increase the concentration of aromatics in the upper layer. Under normal operating conditions there are substantially no aromatics in the uper layer.

In the process of this invention, the isobutane produced in the conjunct polymerization step is recovered and is alkylated with additional olefin. The alkylate thus produced has a high octane number and, because of its paraffinic nature, has an excellent response to tetraethyl lead. This alkylate, when combined with upper layer hydrocarbons that boil within the gasoline range, produces a motor fuel of excellent antiknock characteristics. The paraffins contained therein provide excellent lean mixture response and the aromatics enhance the rich mixture response; being olefin free it is suitable for use in aviation engines. Thus it can be seen that by means of my invention it is possible to convert a single olefin, or a mixture of olefins, to a drying oil and a premium grade motor fuel.

The charging stock used in my process should be an olefin containing from 3 to about 8 carbon atoms, or a mixture thereof. Both open chain and cyclic olefins may be employed. Ethylene is not a desirable charging stock because it tends to form alkyl fluorides when contacted with hydrogen fluoride and because it is difficult to produce good yields of drying oil and alkylate therefrom. Olefins containing more than 8 carbon atoms may be used if desired, but they are not of the preferred class, because the alkylate produced by reacting isobutane with such olefins generally boils outside the gasoline range.

The hydrogen fluoride employed in my process should be substantially anhydrous, i. e., it should not contain more than a few percent of water.

The various objects and advantages of my invention will be apparent from the following description of the accompanying drawing which illustrates in conventional side elevation one form of apparatus in which the present invention may be accomplished.

For purposes of simplification, equipment such as pumps, condensers, receivers, and the like, have been omitted from the drawing, but it is understood that such items are to be employed wherever engineering skill dictates.

Referring now to the drawing, an olefin, in this illustration isobutylene, is passed through line 1 containing valve 2 and into conjunct polymerization reactor 3, wherein it is contacted with hydrogen fluoride under conditions that promote conjunct polymerization. A hydrogen fluoride-hydrocarbon complex, isobutane, and higher boiling upper layer hydrocarbons are formed in this reactor. The reactor effluent is passed through line 4 containing valve 5 and into settler 6 wherein a separation is effected between the hydrocarbon and acid phases. The acid phase, which comprises the hydrogen fluoride-hydrocarbon complex, is withdrawn from settler 6 through line 7 and is passed through a heater 8 and line 9 containing valve 10 and into decomposition tower 11. The decomposition tower is packed with copper rivets for promoting or accelerating the decomposition of the complex and inhibiting degradation reactions of the unsaturated hydrocarbon. If desired, an inert diluent may be added to the decomposition tower in order to retard degradation reactions. The polyunsaturated hydrocarbons, i. e., drying oil, is withdrawn from reactor 11 through line 12 containing valve 13. The liberated hydrogen fluoride is removed overhead from tower 11 through line 14 and, in the usual operation, the bulk of it is passed through line 15, valve 16, and line 17 into alkylation reactor 18. However, if desired, a part or all of the hydrogen fluoride passing through line 14 may be directed through line 19 containing valve 20 and into line 21 and thence into conjunct polymerization reactor 3. Fresh makeup hydrogen fluoride is added to the system through line 22 containing valve 23.

The hydrocarbon phase in settler 6 is withdrawn through line 24 containing valve 25 and is passed into fractionator 26. Isobutane, and hydrogen fluoride that was dissolved in the charge to fractionator 26, are taken overhead through line 27 containing valve 28 and are directed into alkylation reactor 18. The upper layer hydrocarbons boiling above isobutane are removed as a bottoms product from fractionator 26 through line 29 containing valve 30 and are passed into fractionator 31. A fraction with an end point of about 400° F. is removed overhead from fractionator 31 and is passed through line 32 containing valve 33 and into line 34 through which is flowing an alkylate, prepared as hereinafter described.

Isobutylene is directed from line 1 through line 35 containing valve 36 and into alkylation reactor 18 wherein isobutane is alkylated with isobutylene in the presence of hydrogen fluoride. The reactor effluent is passed through line 37 containing valve 38 and is directed into settler 39 wherein a separation is effected between the hydrocarbon and catalyst phases. The catalyst phase, i. e., the acid phase, is withdrawn from settler 39 through line 17 containing valve 40 and is returned to alkylation reactor 18. A portion of the acid flowing through line 17 is directed into line 21 containing valve 41 and into the conjunct polymerization reactor.

The hydrocarbon layer in settler 39 is passed through line 42 containing valve 43 and into fractionator 44. Hydrogen fluoride that was dissolved in the charge thereto and excess isobutane are removed overhead from fractionator 44 through line 45 containing valve 46 and then returned to alkylation reactor 18. Alkylate is removed from the bottom of fractionator 44 through line 34 containing valve 47.

If so desired, separate acid cycles may be maintained for the conjunct polymerization step and for the alkylation step. However, this would involve a separate acid regeneration unit for the alkylation step and hence increase not only the capital costs but also the operating costs of the process.

Both the conjunct polymerization reaction and the alkylation reaction should be carried out in the liquid phase. Hence the pressures should be chosen accordingly.

The conjunct polymerization reaction may be carried out at room temperature and even lower. However, higher temperatures up to and exceeding 200° C. usually are preferred because of the increased yield of isobutane at the expense of other upper layer hydrocarbons that is obtained at the higher reaction temperatures. Furthermore, the upper layer hydrocarbons contain more aromatics at the higher reaction temperatures.

The alkylation step usually is conducted at a temperature below about 55° C.; usually at 35° C. If desired, the temperature may be 0° C. or even lower.

A 1:1 ratio of hydrocarbons to acid is satisfactory in both of the reaction zones. A molal excess of isobutane to olefin charged to the alkylation reactor is desirable in order to promote alkylation and suppress side reactions.

The following example is given to illustrate my invention, but it is not included for the purpose of unduly limiting the generally broad scope of said invention.

*Example*

Isobutylene was subjected to the action of hydrogen fluoride in five different experiments at various temperatures. The experiments were carried out in a one-liter turbo mixer. Depending upon the temperature at which the experiment was to be conducted, a bath of either ice water or boiling water was placed around the reactor. Hydrogen fluoride was then added to the reactor after which the olefin was pressed in over a period of about 30 minutes. After a period of contacting, the reaction mixture was discharged into a copper vessel containing about 400 ml. of normal pentane, cooled to Dry Ice temperature. The acid insoluble upper layer was separated by decantation and was then water washed, dried, depentanized and distilled. The acid layer was decomposed with ice water, washed, and distilled in vacuo. The operating conditions and results of the experiments are listed in the following table:

| Experiment No | 1 | 2 | 3 | 4 | 5 |
|---|---|---|---|---|---|
| Charge, gms.: | | | | | |
| Hydrogen Fluoride | 208 | 191 | 198 | 204 | 195 |
| Isobutylene | 446 | 446 | 446 | 446 | 486 |
| Operating Conditions: | | | | | |
| Bath Temperatures, °C | 0 | 0 | 95 | 95 | 200 |
| Maximum Temperature Observed, °C | 40 | 43 | 129 | 131 | 200 |
| Time of Olefin Addition, Hrs. | 0.45 | 0.45 | 0.43 | 0.50 | 0.67 |
| Time of Additional Stirring, Hrs. | 1.5 | 1.5 | 2.0 | 1.45 | 0.8 |
| Average Pressure, P. s. i. g. | 25 | 30 | 190 | 200 | 1,050 |
| Hydrocarbon Products, gms.: | | | | | |
| Isobutane | 2 | 3 | 18 | 17 | 62 |
| Lower layer (Drying Oil) | 97 | 80 | 157 | 158 | 163 |
| Upper layer | 411 | 395 | 158 | 155 | 139 |
| Ratio of Lower Layer to Upper Layer | 0.24 | 0.20 | 1.00 | 1.02 | 1.17 |

Fractions of the lower layers had maleic anhydride values that ranged from 60 to 100, indicating a high degree of conjugated unsaturation. The upper layer hydrocarbons from each of the experiments were substantially olefin-free. The upper layers from the low temperature runs were substantially aromatic free; whereas the upper layer produced in Experiment 5 at 200° C. contained a substantial amount of aromatics. It should be noted that in Experiment 5, approximately 13% of the isobutylene was converted to isobutane for use in the alkylation step.

I claim as my invention:

1. A process which comprises subjecting a charging stock predominating in an olefin containing from 3 to 8 carbon atoms per molecule to the action of hydrogen fluoride at relatively severe conjunct polymerization conditions thereby to form a hydrogen fluoride-hydrocarbon complex, isobutane, and higher boiling upper layer hydrocarbons, separating said isobutane, and alkylating the same with an olefin containing from 3 to 8 carbon atoms per molecule in the presence of hydrogen fluoride at alkylating conditions.

2. A process which comprises subjecting a charging stock predominating in an olefin containing from 3 to 8 carbon atoms per molecule to the action of hydrogen fluoride at relatively severe conjunct polymerization conditions thereby to form a hydrogen fluoride-hydrocarbon complex, isobutane, and higher boiling upper layer hydrocarbons, separating said isobutane, alkylating the same with an olefin containing from 3 to 8 carbon atoms per molecule in the presence of hydrogen fluoride at alkylating conditions, withdrawing hydrogen fluoride from the alkylation step and supplying at least a portion thereof to the conjunct polymerization step, withdrawing the hydrogen fluoride-hydrocarbon complex from the last named step and supplying it to a decomposition step wherein a complex is decomposed to hydrogen fluoride and a polyunsaturated oil, separating the hydrogen fluoride, and supplying at least a portion thereof to the alkylating step.

3. A process which comprises subjecting isobutylene to the action of hydrogen fluoride at conjunct polymerization conditions thereby to form a hydrogen fluoride-hydrocarbon complex, isobutane, and higher boiling upper layer hydrocarbons, separating said isobutane, and alkylating the same with isobutylene in the presence of hydrogen fluoride at alkylating conditions.

4. A process which comprises subjecting isobutylene to the action of hydrogen fluoride at conjunct polymerization conditions thereby to form a hydrogen fluoride-hydrocarbon complex, isobutane, and higher boiling upper layer hydrocarbons, separating said isobutane, alkylating the same with isobutylene in the presence of hydrogen fluoride at alkylating conditions, withdrawing hydrogen fluoride from the alkylation step and supplying at least a portion thereof to the conjunct polymerization step, withdrawing the hydrogen fluoride-hydrocarbon complex from the last-named step and supplying it to a decomposition step wherein the complex is decomposed to hydrogen fluoride and a polyunsaturated oil, recovering the hydrogen fluoride, and supplying at least a portion thereof to the alkylating step.

5. A process which comprises subjecting a charging stock predominating in an olefin containing from 3 to 8 carbon atoms per molecule to the action of hydrogen fluoride at relatively severe conjunct polymerization conditions thereby to form a hydrogen fluoride-hydrocarbon complex, isobutane and higher boiling upper layer hydrocarbons, separating said isobutane and said higher boiling upper layer hydrocarbons, alkylating the isobutane with an olefin containing from 3 to 8 carbon atoms in the presence of hydrogen fluoride at alkylating conditions, separating the alkylate thus produced, fractionating said higher boiling upper layer hydrocarbons to produce a fraction boiling within the gasoline range, and blending said last-named fraction with said alkylate.

6. A process which comprises subjecting a charging stock predominating in an olefin containing from 3 to 8 carbon atoms per molecule to the action of hydrogen fluoride at relatively severe conjunct polymerization conditions thereby to form a hydrogen fluoride-hydrocarbon complex, isobutane, and higher boiling upper layer hydrocarbons, separating said isobutane and said higher boiling upper layer hydrocarbons, alkylating the isobutane with an olefin containing from 3 to 8 carbon atoms in the presence of hydrogen fluoride at alkylating conditions, separating the alkylate thus produced, fractionating said higher boiling upper layer hydrocarbons to produce a fraction boiling within the gasoline range, and blending said last-named fraction with said alkylate, withdrawing hydrogen fluoride from the alkylation step and supplying at least a portion thereof to the conjunct polymerization step, withdrawing the hydrogen fluoride-hydrocarbon complex from the last-named step and supplying it to a decomposition step wherein the complex is decomposed to hydrogen fluoride and a polyunsaturated oil, separating the hydrogen fluoride, and supplying at least a portion thereof to the alkylating step.

7. A process which comprises subjecting isobutylene to the action of hydrogen fluoride at conjunct polymerization conditions thereby to form a hydrogen fluoride-hydrocarbon complex, isobutane, and higher boiling upper layer hydrocarbons, separating said isobutane and said higher boiling upper layer hydrocarbons, alkylating the isobutane with isobutylene in the presence of hydrogen fluoride at alkylating conditions, separating the alkylate thus produced, fractionating said higher boiling upper layer hydrocarbons to produce a fraction boiling within the gasoline range, and blending said last-named fraction with said alkylate.

8. A process which comprises subjecting isobutylene to the action of hydrogen fluoride at conjunct polymerization conditions thereby to form a hydrogen fluoride-hydrocarbon complex, isobutane, and higher boiling upper layer hydrocarbons, separating said isobutane and said higher boiling upper layer hydrocarbons, alkylating the isobutane with isobutylene in the presence of hydrogen fluoride at alkylating conditions, separating the alkylate thus produced, fractionating said higher boiling upper layer hydrocarbons to produce a fraction boiling within the gasoline range, and blending said last-named fraction with said alkylate, withdrawing hydrogen fluoride from the alkylation step and supplying at least a portion thereof to the conjunct polymerization step, withdrawing the hydrogen fluoride-hydrocarbon complex from the last-named step and supplying it to a decomposition step wherein the complex is decomposed to hydrogen fluoride and a polyunsaturated oil, separating the hydrogen fluoride, and supplying at least a portion thereof to the alkylating step.

CARL B. LINN.

REFERENCES CITED

The following references are of record in the file of this patent:

UNITED STATES PATENTS

| Number | Name | Date |
| --- | --- | --- |
| 2,400,521 | Kuhn | May 21, 1946 |
| 2,401,865 | Gorin et al. | June 11, 1946 |
| 2,407,873 | Evering et al. | Sept. 17, 1946 |
| 2,422,349 | Frey | June 17, 1947 |
| 2,440,459 | Bloch | Apr. 27, 1948 |
| 2,440,477 | Johnstone | Apr. 27, 1948 |